Figure 9:
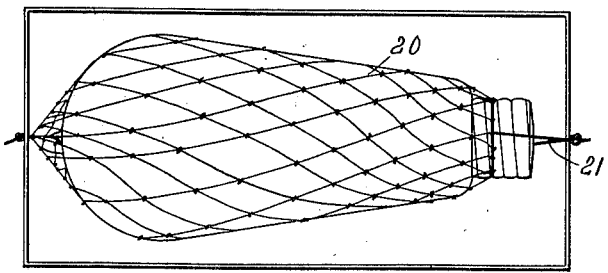

tion of the thermostat the contact finger J begins to move back toward its original position in contact with the contact piece f. As soon as it touches this contact piece a circuit is again completed through the wire M, motor N, contact finger J, contact f, the wire I, contact e, the switch H and the other terminal. The motor again operates moving the switch H back to its original position and this process of switching on and off is repeated automatically as long as the temperature is rising and falling in the oven. In the wire I is placed a switch L by means of which the circuit through the wire may be opened or closed. When the device is operating as above described the switch is closed. If, however, the switch L be opened as soon as the contact finger J has been moved to contact with the contact piece g and the motor thus operated to open the switch H the switch H remains open since the return of the contact finger to engagement with the contact piece f can no longer complete the shunt circuit through the wire I and switch H. Thus it will be seen that as I have arranged the device a predetermined temperature when attained can be maintained in the oven as long as may be desired, or if necessary by opening the switch L the current may be completely cut off as soon as a desired temperature is attained and the contents of the oven allowed to continue cooking by the retained heat alone.

From the above description it will be seen that I have devised an electric oven which will accomplish satisfactorily the objects set out in the preamble to this specification. It is found that the ordinary electric oven is expensive to operate owing to its large consumption of electric energy. The ordinary retained heat cooker is also defective inasmuch as there is no means of replacing the heat which is gradually lost, making the operation of cooking rather slower than is absolutely necessary. By my arrangement I combine the advantages of the retained heat cooker with all the advantages derived from an absolute control of the temperature therein, which control is absolutely automatic. The great economy of my device is of course due to the conservation of the heat by the closely sealable heat insulated casing and the automatic regulation of the consumption of energy whereby the useless consumption of energy is absolutely prevented.

What I claim as my invention is:—

1. Cooking apparatus comprising a casing in combination with electric means for heating the interior of the casing; and means for automatically breaking the heating circuit as soon as a predetermined temperature is attained within the casing and for maintaining the break in the circuit until conditions are manually established for the automatic closing of the circuit on a fall in temperature and manually controllable means for establishing or disestablishing such conditions.

2. Cooking apparatus comprising a casing in combination with electric means for heating the interior of the casing; means for automatically breaking and making the heating circuit controlled by the rise and fall of the temperature within the casing; and manually controlled means whereby the device may previously be set to maintain the break in the circuit after the circuit has been automatically broken.

3. An oven in combination with an electric heating device therefor; a switch in circuit with the heating device; a thermostat exposed to the heat within the oven; a motor for moving the switch arranged in a shunt circuit; and means whereby the thermostat is adapted to alternately close and open the shunt circuit and thus cause the operation of the motor to open the switch; and manually controlled means whereby the device may previously be set to maintain the break in the circuit after the circuit has been automatically broken.

4. The combination of an electric heating element; a main circuit in which said element is inclined; a switch in said circuit; a shunt circuit across the main circuit having a gap therein; a motor adapted to operate the switch and included in the shunt circuit; a contact arm adapted to open and close the gap in the said shunt circuit; a thermostat adapted to move said contact arm; a contact with which the contact arm may engage when moved to break the shunt circuit; a contact with which the switch may engage when moved to break the heating circuit; a wire connecting the last mentioned contacts; and a manually operable switch in said wire.

5. An oven provided with an electric contact socket having two contacts therein in combination with a removable electric heating element having a contact plug with two contacts thereon connected to the heating element and adapted to engage the said socket, and complete the electrical connections when the heating element is put in place.

6. An oven provided with a plurality of electric contact sockets having two contacts therein in combination with a removable electric heating element having a contact plug with two contacts thereon connected to the heating element and adapted to engage any one of the said sockets and complete the electrical connections when the heating element is put in place.

7. In electric heating apparatus the combination of a thermostat; a spindle; means whereby the spindle may be rocked by the movement of the thermostat; a contact arm S. W. OGLESBY & F. R. AYTON.
SUSPENDING STRUCTURE FOR FRAGILE ARTICLES.
APPLICATION FILED APR. 1, 1910.
987,162.
Patented Mar. 21, 1911.
4 SHEETS—SHEET 1.
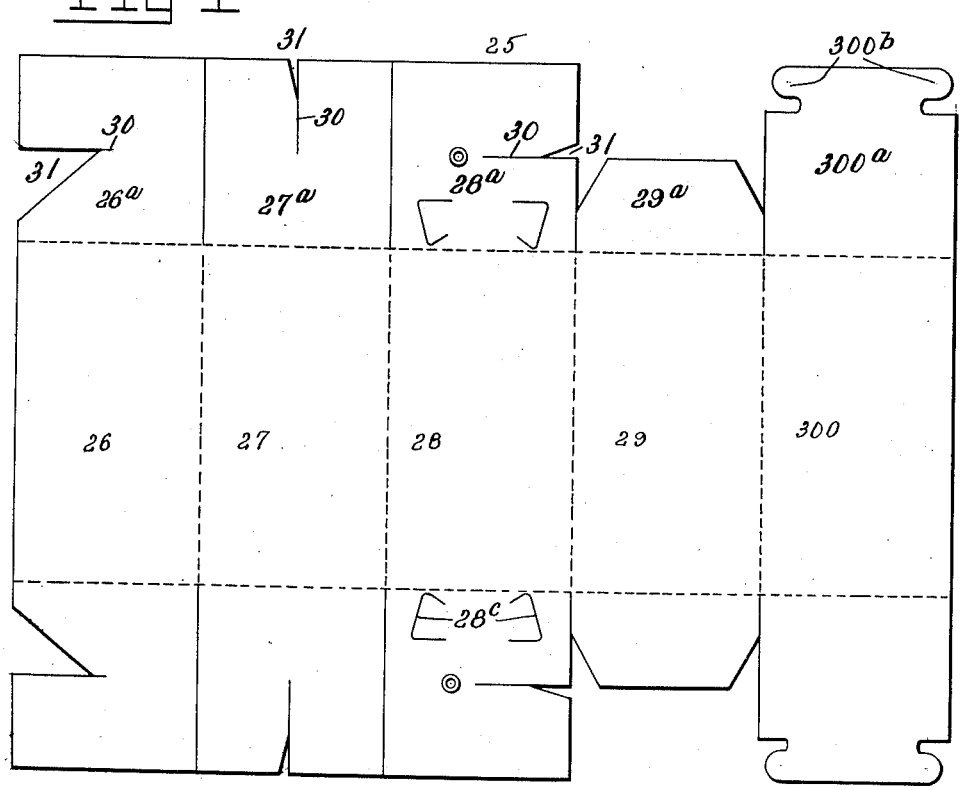
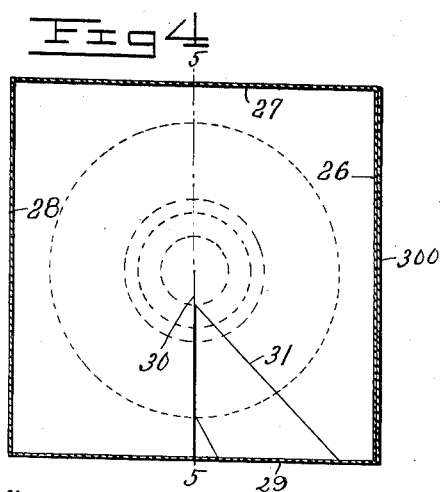
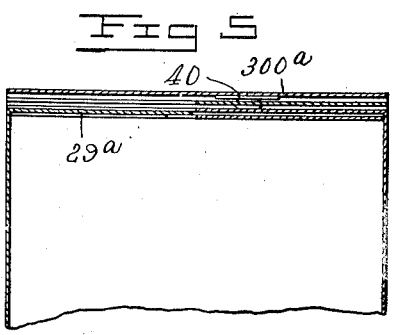
Witnesses
Inventors
Samuel Wesley Oglesby and
Francis Royd Ayton
By Meyers, Cushman & Rea
Attorneys S. W. OGLESBY & F. R. AYTON.
SUSPENDING STRUCTURE FOR FRAGILE ARTICLES.
APPLICATION FILED APR. 1, 1910.
987,162.
Patented Mar. 21, 1911.
4 SHEETS—SHEET 2.
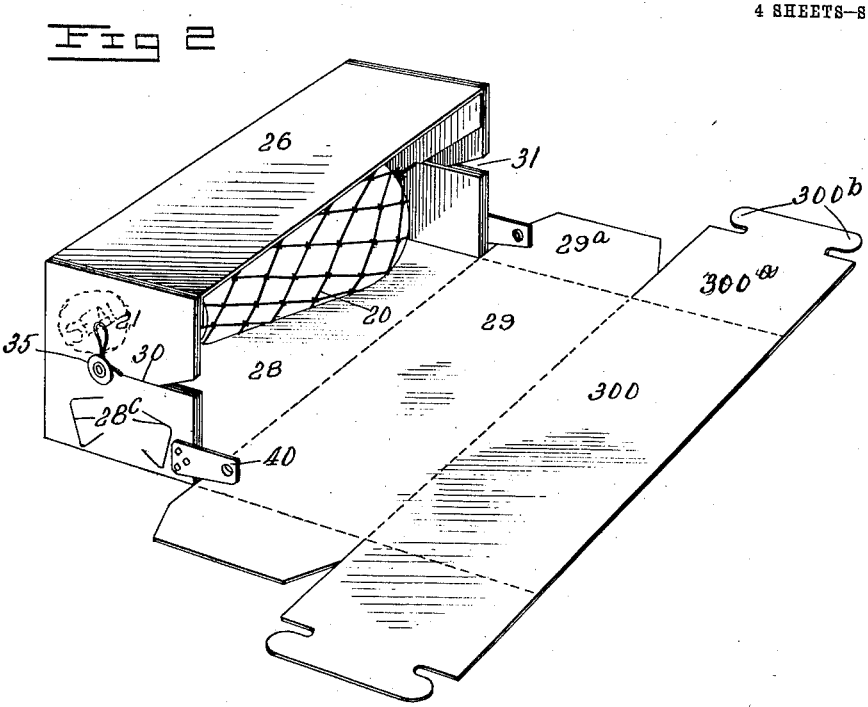
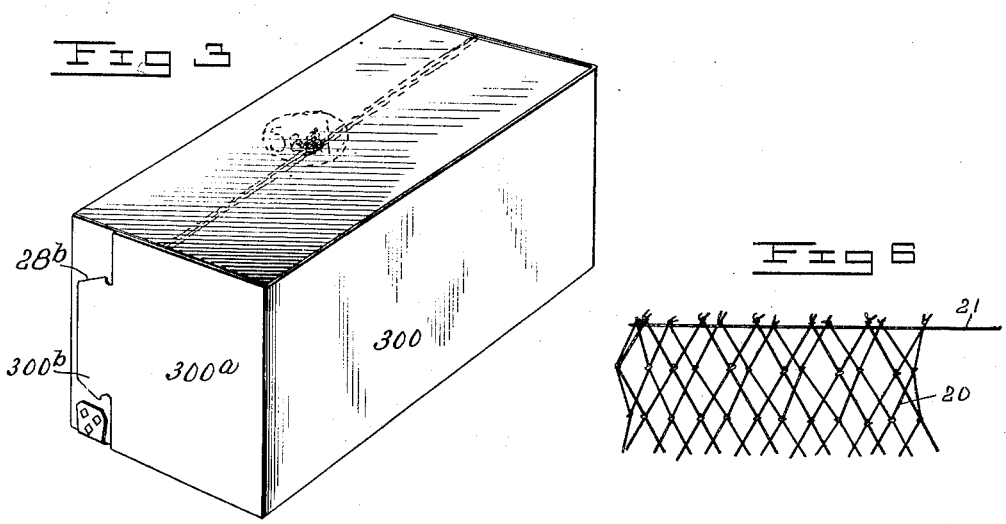
Witnesses
H. G. Bolnick
Horace G. Seitz
Inventor
Samuel Wesley Oglesby and
Francis Royd Ayton.
By Meyers, Cushman & Rea
Attorneys S. W. OGLESBY & F. R. AYTON.
SUSPENDING STRUCTURE FOR FRAGILE ARTICLES.
APPLICATION FILED APR. 1, 1910.
987,162.
Patented Mar. 21, 1911.
4 SHEETS—SHEET 3.
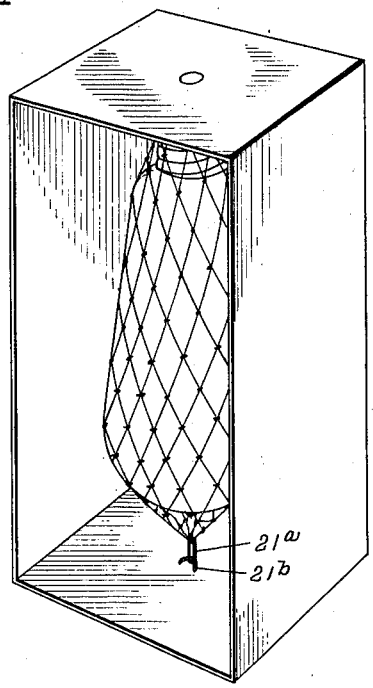
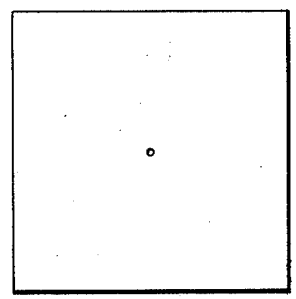
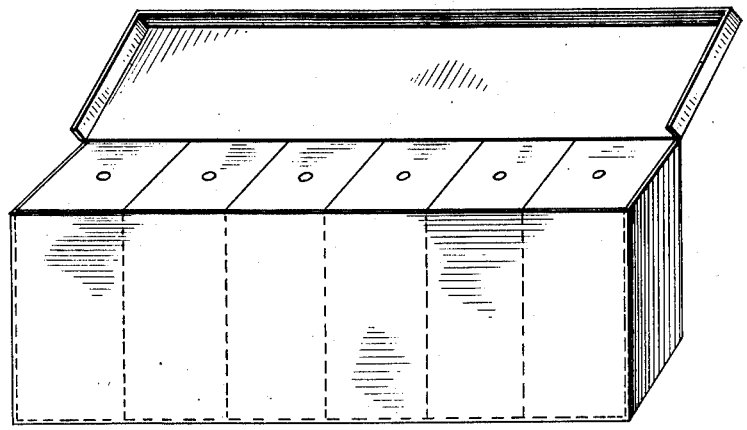

S. W. OGLESBY & F. R. AYTON.
SUSPENDING STRUCTURE FOR FRAGILE ARTICLES.
APPLICATION FILED APR. 1, 1910.

987,162.

Patented Mar. 21, 1911.

4 SHEETS—SHEET 4.

Witnesses
Inventor
Samuel Wesley Oglesby and
Francis Royd Ayton.
By Meyers, Cushman & Rea
Attorneys

UNITED STATES PATENT OFFICE.

SAMUEL WESLEY OGLESBY AND FRANCIS ROYD AYTON, OF LONDON, ENGLAND.

SUSPENDING STRUCTURE FOR FRAGILE ARTICLES.

987,162.      Specification of Letters Patent.      Patented Mar. 21, 1911.

Application filed April 1, 1910. Serial No. 552,823.

*To all whom it may concern:*

Be it known that we, SAMUEL WESLEY OGLESBY and FRANCIS ROYD AYTON, subjects of the King of Great Britain, residing at London, England, have invented new and useful Improvements in Suspending Structures for Fragile Articles, of which the following is a specification.

Our invention relates to improvements in devices for the packing or transportation of fragile articles, such, for instance, as incandescent lamps, particularly of the type using metallic filaments, and has particular relation to such devices adapted to suspend the article within a casing or other package.

The principal object of our invention is to provide a device of this type, in which the article is suspended within a flexible or resilient carrier formed of suitable material, such as fabric, the latter being in the form of a sleeve adapted to receive the article, the ends of the sleeve being supported in suitable manner by a container within the confines of which the article is to be suspended.

A further object is to provide a container formed to permit of an expeditious positioning of the sleeve or carrier for the article therein, and which will support the latter therein in such manner as to retain the article out of contact with the casing.

A further object is to provide an article carrier which is both flexible and resilient, to permit of the necessary shaping thereof to the article, and to permit the ends of the sleeve or carrier to be contracted in order that the article may not be permitted to drop out of the sleeve or carrier.

Other and further objects of the invention are to provide a device for this purpose which is simple and efficient in operation, compact in structure, readily placed in position, and which can be manufactured at a relatively low cost.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

Figure 10:
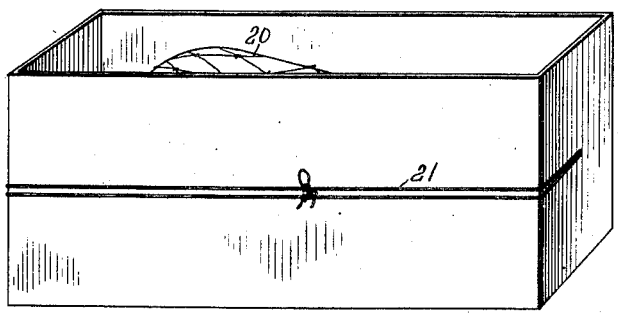
Figure 11:
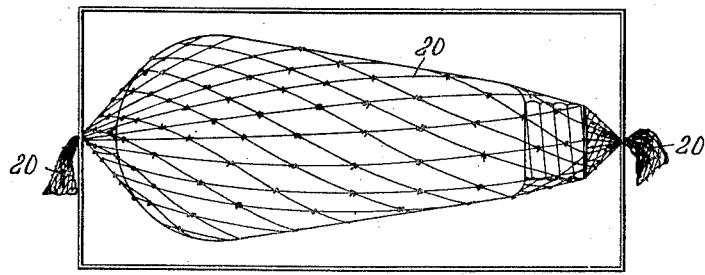

In the accompanying drawings, in which similar reference characters indicate similar parts in each of the views,—Figure 1 is a plan view of a blank used in forming one type of container preferably employed by us. Fig. 2 is a perspective view of the container shown in Fig. 1, partially folded, and showing the sleeve or article carrier positioned therein. Fig. 3 is a perspective view showing the container illustrated in Fig. 1, the container being shown as completely folded. Fig. 4 is a cross-sectional view of the container shown in Fig. 3. Fig. 5 is a sectional view taken on line 5—5 of Fig. 4. Fig. 6 is a fragmentary view illustrating the sleeve or carrier, and indicating the manner in which the latter is expanded. Fig. 7 is a view of a different type of container and illustrates a different manner of mounting the sleeve or carrier therein. Fig. 8 is a perspective view of a shipping case adapted to contain a plurality of containers such as illustrated in the drawings. Figs. 9, 10 and 11 are views indicating modified ways in which the sleeve or carrier may be positioned or secured within the container. Fig. 12 is a detail view indicating the end of a container having a modified form of opening for the passage of the sleeve or its securing strings.

Our invention embodies two elements which are combined to provide the complete result, viz., a structure which will support an electric light bulb of incandescent type in safety when not in position for use. These elements consist of the fabric carrier shown specifically in Fig. 6, and the container within which the carrier is mounted. These elements are combined by the removable insertion of the fabric carrier within the container, the carrier having first received the incandescent bulb. The container may be of any desired type, a number of forms being shown in the drawings, we preferring, however, the use of the container disclosed more particularly in Figs. 1 to 5 of the drawings. These elements will be described separately and in so doing we will first describe the fabric carrier.

The fabric carrier, designated as 20, is made preferably in the form of a sleeve, and may be made up of any desired material or form. It is preferably of a flexible resilient material, these qualities being provided either by the material itself, or by the manner in which the strands of the material are connected together. As examples of the material and form of the sleeve, we would state that it may conveniently be made of an open web, such as is used for the manufacture of incandescent gas mantles; or it can be made of any woven material, such as stockinette, cotton, silk, wool, ramie, or the like, or the sleeve might be made of rubber, or of flexible resilient paper, or the like. The sleeve is diagrammatically indicated in Fig. 6, which discloses one way in which it may be made up, said view, however, indicating more particularly the end-string construction or connection by means of which the ends of the sleeve may be closed up after the bulb has been inserted, this structure being along the lines of what is known as the "draw-string" type, the string in this view being indicated at 21; as the string or strings are located at the end of the sleeve, it will be readily understood that after the bulb has been inserted the drawing up of the string 21 at the opposite ends of the sleeve, will serve to cause the sleeve or carrier to hug the outer surface of the bulb and prevent relative movement of the bulb and sleeve, the form of the sleeve lending itself especially to fitting the irregularities in shape of the exterior of the bulb. If desired, the string 21 may be in the form of elastic, or other forms of loops, indicated at 21$^a$, Fig. 7, or the strings may be entirely omitted and the sleeve be made of sufficient length to form, in itself, means by which it may be attached at its opposite ends to the container, as indicated in Fig. 11. The strings 21 may be of any desired length to permit of a proper clasping thereof to the container, various forms of fastening being disclosed in the drawings; and if desired, a suitable seal may be placed over the strings.

The container may be of any preferred design, and made up of cardboard, pasteboard, wood, metal, or composition, these being exemplifications only, and may be permanently made up of any shape, or may be made up in the form of a foldable box, the latter type being preferred.

Various types of container are shown in the drawing. For instance, Fig. 7 discloses a four-sided frame, opposite sides being open, the frame having its ends formed with openings through which the strings or carrier may extend, or which may have inwardly projecting hooks 21$^b$, adapted to receive the loops 21$^a$. In Fig. 8 we have shown a case with a number of containers located therein, showing one way in which a plurality of containers may be transported, this view illustrating the fact that while there are a number of bulbs contained in a single transporting case, each bulb is held in such manner as to not only withstand shocks, etc., incident to transportation, but also are held in such manner as to prevent contact of one bulb with another, excepting by so damaging the box as to break the bulbs.

As shown in Figs. 10 and 12, the container may be in the form of a closed box having its ends formed with openings for the passage of the strings, the ends of the latter being secured in a manner such as by tying as indicated in Fig. 10; or the opening may be provided for passage of the ends of the sleeve itself, as indicated in Fig. 11, the exposed portions of the sleeve being expanded in such a way as to retain the sleeve in its position within the container. These various forms of containers may be permanently made up or be of a folded type, as desired, said views indicating various ways in which the sleeve may be mounted. Our preferred form of container, however, is that of a foldable box structure, such as indicated in Figs. 1 to 5, inclusive. This box is formed from a blank, as indicated in Fig. 1 at 25, and formed of a central portion which is preferably foldable into five sides, 26, 27, 28, 29 and 300, these sides, in the folded box, being adapted to provide a box having four walls. Each of the sides has end portions or flaps, each of a different configuration, and each serving its function in closing the ends of the box and securing it in closed position. As will be seen, the end portions indicated as 26$^a$, 27$^a$, and 28$^a$, are of approximately equal length and breadth, each having, however, a slit 30 leading from one of its edges to the approximate center of the end portion, the slits 30 of the end portions 26$^a$ and 28$^a$ leading inwardly from the opposite sides of the end portions, while the slit for the portion 27$^a$ leads inwardly from the end of that portion. Each of the portions 26$^a$, 27$^a$, and 28$^a$, are cut away at an angle to the slitted line 30, for the purpose of forming a cutaway portion or mouth 31 leading to the slits 30.

As will be seen from Figs. 2 and 4, the folding of the box blank places the slits 30 in superposed alinement, the throats 31 providing for the passage into the slits 30 of the string 21, or of the ends of the sleeve when the latter is mounted in the manner indicated in Fig. 11.

In Fig. 2 we have illustrated the manner in which the sleeve and bulb are sustained within the container, showing one way in which the ends of the strings 21 may be secured in position, the securing device in this case being in the form of a holdfast 35, around which the ends of the string are wound, the holdfasts being preferably formed on the end portions 28$^a$. As will be readily understood, however, the holdfast 35 may be omitted and the ends of the strings carried around the box and tied, as indicated in Fig. 10, and in dotted lines in Fig. 3. When the box has been folded in this